(12) United States Patent
Trivedi (10) Patent No.: US 10,055,340 B2
(45) Date of Patent: *Aug. 21, 2018

(54) DYNAMIC TEST TOPOLOGY VISUALIZATION

(71) Applicant: International Business Machines Corporation, Armonk, NY (US)

(72) Inventor: Alok A. Trivedi, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 149 days.

This patent is subject to a terminal disclaimer.

(21) Appl. No.: 14/735,666

(22) Filed: Jun. 10, 2015

(65) Prior Publication Data

US 2016/0364324 A1    Dec. 15, 2016

(51) Int. Cl.
    G06F 11/36    (2006.01)
    G06F 17/30    (2006.01)

(52) U.S. Cl.
    CPC ...... *G06F 11/3692* (2013.01); *G06F 11/3608* (2013.01); *G06F 11/3664* (2013.01); *G06F 11/3684* (2013.01); *G06F 11/3688* (2013.01); *G06F 17/3056* (2013.01); *G06F 17/30477* (2013.01); *G06F 17/30554* (2013.01)

(58) Field of Classification Search
    CPC ............. G06F 11/3608; G06F 11/3664; G06F 11/3692
    USPC ......................................................... 717/125
    See application file for complete search history.

(56) References Cited

U.S. PATENT DOCUMENTS

| | | |
|---|---|---|
| 6,618,854 B1 | 9/2003 | Mann |
| 7,257,804 B2 | 8/2007 | Baecker |
| 7,620,856 B2 | 11/2009 | Kagan et al. |
| 8,145,751 B2 | 3/2012 | Creamer |
| 8,239,831 B2 | 8/2012 | Brennan et al. |
| 8,370,803 B1 | 2/2013 | Holler |
| 8,549,522 B1 | 10/2013 | Chatterjee et al. |
| 8,572,437 B2 | 10/2013 | Chang et al. |
| 8,719,776 B2 | 5/2014 | Eteminan |
| 8,788,685 B1 | 7/2014 | Boyles |
| 8,856,748 B1 | 10/2014 | Larsen et al. |
| 8,938,683 B2 | 1/2015 | Bentrup |

(Continued)

FOREIGN PATENT DOCUMENTS

| | | |
|---|---|---|
| CN | 101639806 A | 2/2010 |
| CN | 102118281 B | 6/2013 |

OTHER PUBLICATIONS

U.S. Appl. No. 15/248,005, filed Aug. 26, 2016.

(Continued)

*Primary Examiner* — John Chavis
(74) *Attorney, Agent, or Firm* — Alexander G. Jochym (57) ABSTRACT

An approach for dynamic test topology visualization is provided. The approach retrieves test data from one or more databases. The approach retrieves test data from an application under test. The approach creates a visual diagram, wherein the visual diagram includes one or more topological elements, one or more topological relationships between the one or more topological elements, the test data, and a screen snapshot of an application under test. The approach overlays the visual diagram with user interaction information. The approach associates the visual diagram to the test execution performed on the application under test.

20 Claims, 4 Drawing Sheets

(56) References Cited

U.S. PATENT DOCUMENTS

| | | | |
|---|---|---|---|
| 8,966,447 B2 | 2/2015 | Hoke et al. | |
| 9,003,362 B2 | 4/2015 | Lam | |
| 9,342,439 B2 | 5/2016 | Gopalakrishnan | |
| 9,495,277 B1* | 11/2016 | Trivedi | G06F 17/30477 |
| 9,519,570 B2* | 12/2016 | Srinivasan | G06F 11/3664 |
| 9,632,923 B2* | 4/2017 | Trivedi | G06F 17/30477 |
| 9,811,451 B1 | 11/2017 | Arguelles et al. | |
| 2007/0061625 A1 | 3/2007 | Acosta, Jr. et al. | |
| 2007/0156420 A1 | 7/2007 | Meier | |
| 2008/0126165 A1 | 5/2008 | Buchner | |
| 2010/0313185 A1 | 12/2010 | Gupta et al. | |
| 2012/0159351 A1 | 6/2012 | Bell | |
| 2012/0266135 A1 | 10/2012 | Mansour et al. | |
| 2013/0007522 A1 | 1/2013 | Kurapati et al. | |
| 2013/0152047 A1 | 6/2013 | Moorthi | |
| 2014/0317605 A1 | 10/2014 | Gataullin et al. | |
| 2015/0067642 A1 | 3/2015 | Chen | |
| 2015/0106670 A1 | 4/2015 | Gintis | |
| 2015/0269059 A1* | 9/2015 | Srinivasan | G06F 11/3664 714/38.1 |
| 2015/0319071 A1 | 11/2015 | Kaasila et al. | |
| 2016/0048443 A1 | 2/2016 | Ligman et al. | |
| 2016/0364320 A1* | 12/2016 | Trivedi | G06F 11/3608 |

OTHER PUBLICATIONS

Muthukrishnan et al., "Inferring tree topologies using flow tests", Jan. 2003, 2 pages.

Kakoee et al., "A distributed and topology-agnostic approach for on-line NoC testing", Apr. 2011, 8 pages.

Reza et al., "Regression Testing of GPU/MIC Systems for HPCC", May 2015, 8 pages.

Cross et al., "Dynamic Program Visualizations: An Expert Report", Mar. 2014, 6 pages.

U.S. Appl. No. 15/399,899, filed Jan. 6, 2017.

U.S. Appl. No. 14/735,666, filed Jun. 10, 2015.

"A System and Method for Tracking Test Automation Execution Process Instantaneously Based on Graphical View", IP.com No. 000210670, Publication Date: Sep. 8, 2011, <http://ip.com/IPCOM/000210670>.

"Method and System of Requirement Driven Test Environment Configuration Through Automation Approach", IP.com No. 000212358, Publication Date: Nov. 8, 2011, <http://ip.com/IPCOM/000212358>.

"System and Method for Continuous Build, Test and Deployment of Software Solutions Using Dynamic Virtualization Infrastructure", IP.com No. 000199713, Publication Date: Sep. 15, 2010, <http://ip.com/IPCOM/000199713>.

Zhang et al., "The peer-to-peer trace archive: design and comparative trace analysis", Nov. 2010, 2 pages.

Kim et al., "IntroPerf: transparent context-sensitive multi-layer performance interference using system stack traces", Jun. 2014, 13 pages.

Appendix P (List of IBM Patents or Patent Applications Treated As Related) filed Oct. 24, 2017, 2 pages.

* cited by examiner

DYNAMIC TEST TOPOLOGY VISUALIZATION

BACKGROUND OF THE INVENTION

The present invention relates generally to application testing, and more particularly to creating a dynamic test topology visualization for post-test execution results analysis.

In a typical information technology (IT) deployment of software, an application may reside on a machine or device that may be interconnected with additional sources, such as software and hardware. The application may be dependent on the additional sources. Furthermore, the application may consume information and data from these additional sources. While an end user of the application may not be exposed to each of the additional sources at one time, reliance of the application on the additional sources may pose a problem related to functionality, such as where one of the additional sources may be unavailable or incapable of providing data.

Before an application may be released into a market, application testers ensure qualitative aspects of the application and system are thoroughly tested and verified.

SUMMARY

Aspects of an embodiment of the present invention disclose a method, a computer system, and a computer program product for dynamic test topology visualization, in accordance with an embodiment of the present invention. The method includes retrieving, by one or more computer processors, test data from an application under test. The method includes creating, by one or more computer processors, a visual diagram, wherein the visual diagram includes one or more topological elements, one or more topological relationships between the one or more topological elements, the test data, and a screen snapshot of an application under test. The method includes overlaying, by one or more computer processors, the visual diagram with user interaction information. The method includes associating, by one or more computer processors, the visual diagram to the test execution performed on the application under test.

DETAILED DESCRIPTION

Implementation of such embodiments may take a variety of forms, and exemplary implementation details are discussed subsequently with reference to the Figures.

Figure 1:
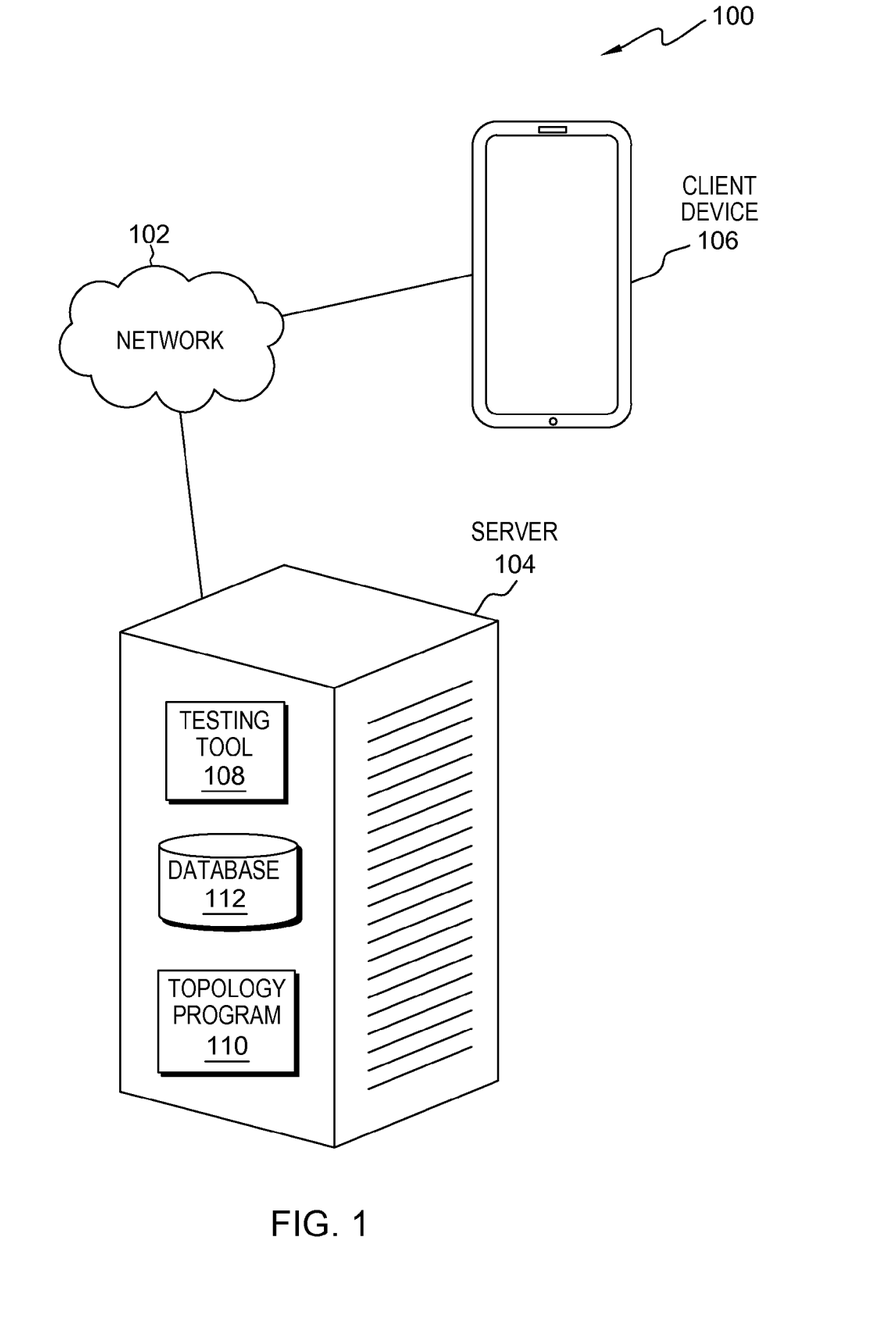
FIG. 1 is a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and client device 106.

In the exemplary embodiment, network 102 is the Internet representing a worldwide collection of networks and gateways that use TCP/IP protocols to communicate with one another. Network 102 may include wire cables, wireless communication links, fiber optic cables, routers, switches, and/or firewalls. Server 104 and client device 106 are interconnected by network 102. Network 102 can be any combination of connections and protocols capable of supporting communications between server 104, client device 106, testing tool 108, and topology program 110. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system, such as a management server, a web server, or any other electronic device or computing system capable of sending and receiving data. In another embodiment, server 104 may be a data center consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes testing tool 108, topology program 110, and database 112.

In the exemplary embodiment, client device 106 is a client to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device capable of connecting to a network, such as network 102, to communicate with a central server, such as server 104, to utilize one or more software-based programs, such as testing tool 108 and topology program 110. In one embodiment, client device 106 may be any suitable type of mobile device capable of running mobile applications, including a smart phone, tablet, slate, or any type of device that runs a mobile operating system.

In the exemplary embodiment, testing tool 108 is a software-based component operating on a central server, such as server 104, for creating, modifying, and running a plurality of tests on one or more application assets on a client device, such as client device 106. In one embodiment, testing tool 108 provides the capability to test a user interface and performance of one or more applications on a client device, such as client device 106. In another embodiment, testing tool 108 provides the capability to automate load and scalability testing of web and server-based software applications. In yet another embodiment, testing tool 108 captures network traffic rendered when an application under test (AUT) interacts with a server, such as server 104, and further emulates the network traffic on one or more virtual servers while playing back the test. In one embodiment, testing tool 108 performs a test on an AUT based on a pre-defined test flow and a plurality of pre-defined performance indicators. In one embodiment, testing tool 108 manages test execution functions on an AUT, as well as reporting functions associated with test data and post-execution test scripts.

In one embodiment, testing tool 108 communicates with a client device, such as client device 106, via a testing tool client application (not shown), where the testing tool client application is an application utilized by testing tool 108 when testing one or more applications on the client device (i.e., target device). In one embodiment, the testing tool client application acts as an agent for testing tool 108, where testing tool client application monitors and reports back test data gathered during a test execution on an application on the client device. In one embodiment, the testing tool client application collects information received from a testing tool agent (not shown) on a server having an AUT application server (not shown), as well as sensory data from device state of a client device alongside functional steps performed on the AUT. In one embodiment, the testing tool client application collects response times and other performance counters. In one embodiment, the testing tool client application sends collected information to testing tool 108 on server 104 for use in creating a dynamic topology diagram with overlay of test step results and relationships between various components. For example, the testing tool agent collects AUT machine specific parameters, such as operating system (OS), random access memory (RAM), computer processing unit (CPU), etc., and feeds the parameters back to the testing tool client application. The testing tool client application collates such information alongside a client device state (GPS, etc.), functional test step results (e.g., pass, fail), and performance data (response times, resource counters, etc.), and further sends this information to testing tool 108 on server 104. Topology program 110 utilizes this information to create a dynamic topology diagram and create a visual overlay of information on top of the dynamic topology diagram. Topology program 110 provides the capability for step-step walkthrough of the dynamic topology diagram in a storyboard-like layout. In some embodiments, the testing tool client application is a native application installed on a client device, such as client device 106. In some other embodiments, the testing tool client application is a web-based application that operates in a browser window on a client device, such as client device 106.

In the exemplary embodiment, topology program 110 operates on a central server, such as server 104. In yet another embodiment, topology program 110 may be utilized as a software service provided by a third-party cloud service provider (not shown).

In the exemplary embodiment, topology program 110 is a software-based program for dynamic test topology visualization. In one embodiment, topology program 110 provides the capability to present a post-test execution results analysis through a dynamic representation of the post-test execution results, where the dynamic representation is a visualization of topographical information regarding an environment that testing was performed in. In one embodiment, topology program 110 creates a topographical representation of a test execution on an AUT, where the topographical representation includes topographical elements interacted with during the test execution, such as devices, servers, networks, etc. In one embodiment, topology program 110 displays topological elements in an interactive and dynamic visualization, such that a user (e.g., tester) can navigate through a previously administered test execution step by step visually. Topology program 110 utilizes collected information to create a dynamic topology diagram and create a visual overlay of the collected information on top of the dynamic topology diagram. Topology program 110 provides the capability for step-step walkthrough of the dynamic topology diagram in a storyboard-like layout based on a test execution and related test steps.

In the exemplary embodiment, database 112 is a conventional database on a central server, such as server 104, for storing a plurality of test data, where test data may include, without limitation, a plurality of test logs associated with test executions performed on one or more AUTs, a plurality of post-execution test results from testing performed on the one or more AUTs, and existing test scripts of test executions performed on the one or more AUTs.

Figure 2:
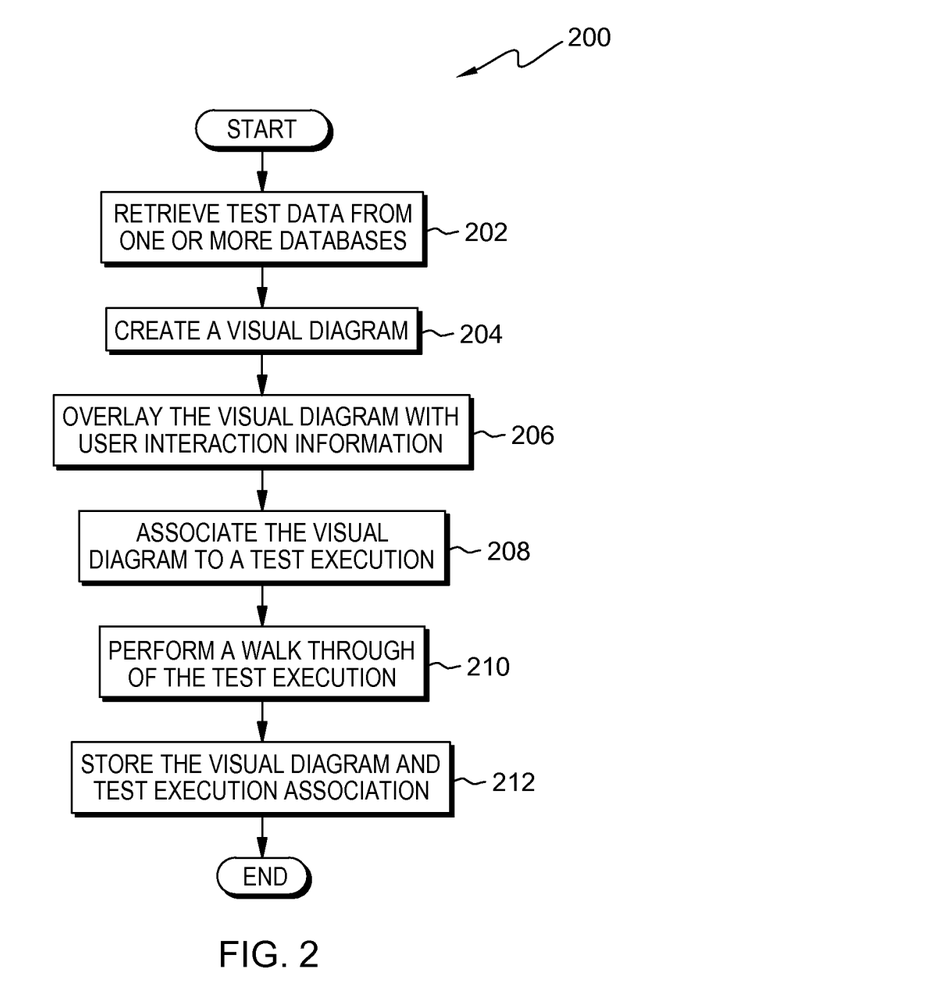
FIG. 2 is a flowchart depicting operational steps of a topology program, such as the topology program of FIG. 1, generally designated 200, for dynamic test topology visualization, in accordance with an embodiment of the present invention.

FIG. 2 is a flowchart depicting operational steps of a topology program, such as topology program 110 of FIG. 1, generally designated 200, for dynamic test topology visualization, in accordance with an embodiment of the present invention.

Topology program 110 retrieves test data from one or more databases (202). In one embodiment, topology program 110 retrieves test data from one or more databases, such as database 112, by extracting test data and system information available in one or more test logs (i.e., test execution logs) within the one or more databases.

Topology program 110 creates a visual diagram (204). In one embodiment, topology program 110 creates a visual diagram representative of an AUT as it may appear on a screen while under test. In one embodiment, topology program 110 creates the visual diagram by converting test data, system information, and text statements within the test data and the system information into one or more visual diagram elements (i.e., topological elements) of the visual diagram. For example, topology program 110 may convert system information, such as a network type, into a graphical representation indicative of the network type, such as a network tower, a cell tower, a cloud, or any other graphical representation sufficient to indicate the network type. In another example, topology program 110 may include a text description of the graphical representation, such as "cellular network", associated with a cell tower graphic. In one embodiment, topology program 110 may retrieve the one or more visual diagram elements from a database (not shown), a network, a catalog, etc. In one embodiment, the one or more visual diagram elements may include, without limitation, a snapshot of an application screen, a graphic representation of test data, system data, text statements, a connector to a server that one or more requests are sent, a connector to a server that one or more requests are received, a network type represented using annotations on a diagram, and a native device feature accessed, etc.

Topology program 110 overlays the visual diagram with user interaction information (206). In one embodiment, topology program 110 overlays the visual diagram with user interaction information by overlaying test data and a plurality of performance indicators on top of the visual diagram correlated to user (i.e., tester) interaction with a testing tool, such as testing tool 108, and the AUT. In another embodiment, topology program 110 may retrieve stored user interaction information, test data, and the plurality of performance indicators from a database, such as database 112.

Topology program 110 associates the visual diagram to the text execution (208). In one embodiment, topology program 110 associates the visual diagram (i.e., the dynamic test topology) to the test execution performed on the AUT, providing a visual overlay of test data and a plurality of performance indicators on top of the visual diagram for post-test analysis.

Topology program 110 performs a walkthrough of a test execution on the visual diagram (210). In one embodiment, topology program 110 performs a walkthrough of a test execution performed on an AUT on the visual diagram by transmitting visual information in a step by step navigation, where transmitting includes displaying the visual information in a step by step navigation on a test screen.

Topology program 110 stores the visual diagram and test execution association (212). In one embodiment, topology program 110 stores the visual diagram and test execution association in one or more databases, such as database 112, to provide the capability to compare and analyze change in dynamic test topology over a plurality of test executions performed on the AUT.

Figure 3:
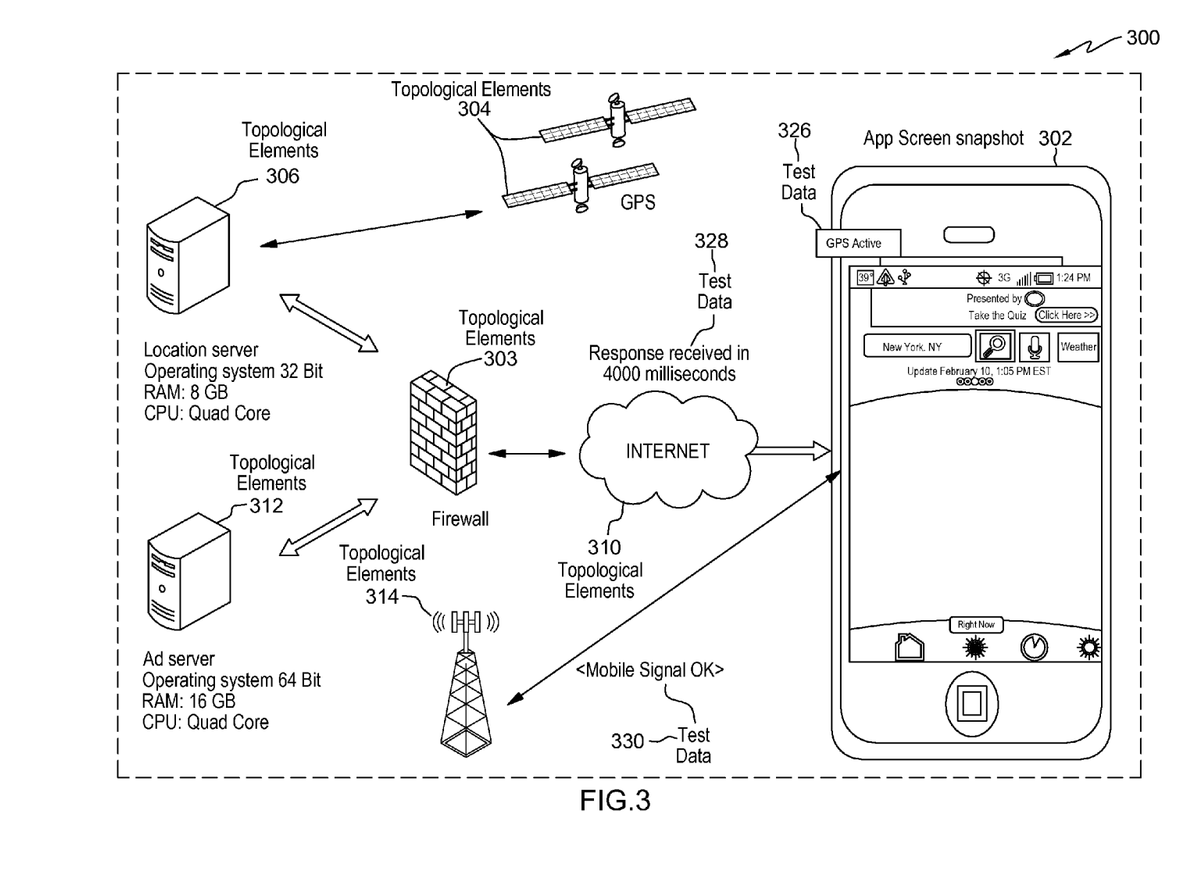
FIG. 3 is a screenshot of a test screen including a dynamic test topology visualization, generally designated 300, in accordance with an embodiment of the present invention.

FIG. 3 is a screenshot of a test screen including a dynamic test topology visualization, generally designated 300, in accordance with an embodiment of the present invention.

Screenshot 300 includes app screen snapshot 302, where app screen snapshot 302 is a snapshot of a screen of an AUT on a client device, such as client device 106 of FIG. 1, where the snapshot of the screen represents a particular step during a test execution on the AUT. In one embodiment, topology program 110 provides a tester with the capability to walk-through post-execution test results in a step by step process, allowing for individual selection of one or more steps performed in the test execution for analysis. In one embodiment, topology program 110 changes app screen snapshot 302 dynamically based on the selection of one or more steps, providing an abstraction within screenshot 300 to display one or more tester interactions with the AUT.

Screenshot 300 includes one or more topological elements, such as topological element 303, 304, 306, 310, 312, and 314. In one embodiment, the one or more topological elements include, without limitation, a server, a global positioning system (GPS), a firewall, a network (e.g., Internet, cellular network, etc.), and a client device, etc. In one embodiment, the one or more topological elements may include a plurality of information related to the topological element. For example, topological element 306 may be a server computer, where the topological element may include operating system (OS) information, random access memory (RAM) information, computer processing unit (CPU) information, and server description information, etc.

Screenshot 300 includes one or more topological relationships, such as the topological relationship between topological element 304 and topological element 306. In one embodiment, topology program 110 displays the one or more topological relationships between one or more topological elements as the one or more topological relationships develop relative to each of the one or more steps performed during a test execution on an AUT. In one embodiment, topology program 110 displays the one or more topological relationships as indicator arrows between the one or more topological elements, such that the indicator arrows indicate underlying computing and interactions between the one or more topological elements during the one or more steps performed during a test execution on an AUT, allowing a tester to navigate the topological element relationships and visually relate test result data to specific test steps while the AUT screen snapshot, such as app screen snapshot 302, and overall topology is displayed.

Screenshot 300 includes one or more test data overlays, such as test data 326, 328, and 330. In one embodiment, the one or more test data overlays represent post-execution test data results and a plurality of performance indicators for specific steps performed during a test execution on an AUT. In one embodiment, topology program 110 displays the one or more test data overlays to provide a representation of post execution test data result relative to an environment that a test execution was performed in. The one or more test data overlays may be interacted with to extrapolate information in a step by step mechanism from the visual overlay of test result data. In one embodiment, topology program 110 displays the one or more test data overlays as the one or more test data overlays become relevant with regard to a specific step in a text execution performed on an AUT. For example, where a particular test data overlay is relevant to a specific step in a test execution on an AUT, such as step 3, topology program 110 may display the test data overlay during a tester interaction with step 3, and further remove the test data overlay once the tester progresses to a subsequent step in the test execution results. In one embodiment, topology program 110 may store one or more links (i.e., associations) between one or more topological elements (e.g., a network, a client device, a server, etc.) and test data (e.g., a device signal, a transmission speed, etc.) in a database, such as database 112, such that where the test data indicates a signal is transmitted from a device to a network, the device, the signal, the transmission speed, and the network are depicted on a visual diagram with one or more graphical elements (a device symbol, a network symbol, a relationship indicator arrow, etc.). In one embodiment, orientation of the one or more graphical elements within the visual diagram may be based on, for example, size constraints and spatial constraints, as well as various layouts known in the art.

Figure 4:
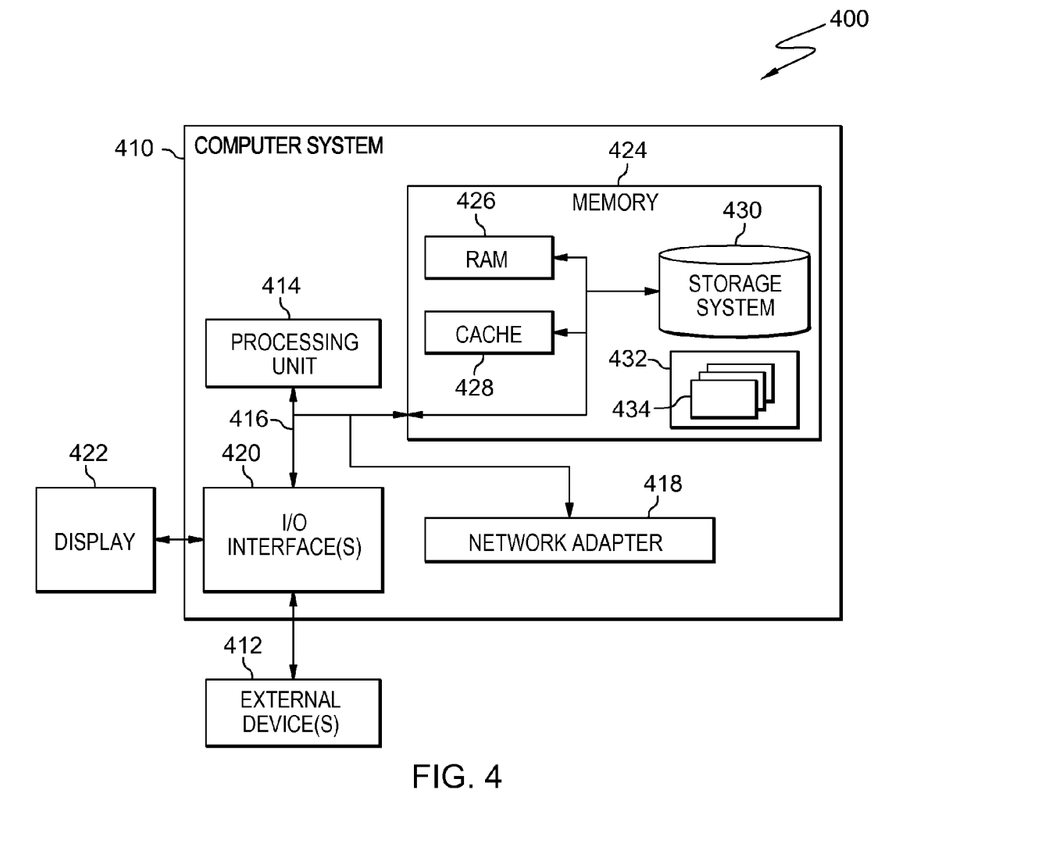
FIG. 4 is a block diagram depicting components of a data processing system (such as the server of FIG. 1), generally designated 400, in accordance with an embodiment of the present invention.

FIG. 4 depicts a block diagram of components of data processing environment 100, such as server 104 of FIG. 1, generally designated 400, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 410. The components of computer system 410 may include, but are not limited to, one or more processors or processing unit 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for dynamic test topology visualization, the method comprising:
    retrieving, by one or more computer processors, test data from an application under test;
    creating, by one or more computer processors, a visual diagram, wherein the visual diagram includes one or more topological elements, one or more topological relationships between the one or more topological elements, the test data, and a screen snapshot of the application under test;
    overlaying, by one or more computer processors, the visual diagram with user interaction information; and
    associating, by one or more computer processors, the visual diagram to the test execution performed on the application under test.

2. The method of claim 1, wherein retrieving test data from an application under test, further comprises at least one of:
    retrieving, by one or more computer processors, test data from the application under test from one or more databases;
    receiving, by one or more computer processors, test data from the application under test from a testing tool; and
    extracting, by one or more computer processors, test data and system information from one or more test execution logs within the one or more databases.

3. The method of claim 1, wherein creating a visual diagram, further comprises:
    converting, by one or more computer processors, test data, system information, and a plurality of text statements within the test data and the system information into one or more visual diagram elements.

4. The method of claim 3, wherein the one or more visual elements include one or more of:
    a snapshot of an application screen;
    a graphical representation of the test data, the system information, and the plurality of text statements;
    a connector to a server;
    a network type; and
    a native device feature.

5. The method of claim 1, wherein overlaying the visual diagram with user interaction information, further comprises:
    overlaying, by one or more computer processors, test data and a plurality of performance indicators on top of the visual diagram correlated to tester interaction with a testing tool.

6. The method of claim 1, wherein associating the visual diagram to the test execution performed on the application under test, further comprises:
    storing, by one or more computer processors, the visual diagram and test execution association.

7. The method of claim 1 further comprises:
    performing, by one or more computer processors, a walk-through of a test execution performed on the application under test.

8. The method of claim 7, wherein performing a walk-through of a test execution performed on the application under test, further comprises:
    transmitting, by one or more computer processors, visual information in a step by step navigation;

transmitting, by one or more computer processors, one or more topological elements relative to one or more steps performed during the test execution on the application under test;

transmitting, by one or more computer processors, one or more topological relationships between the one or more topological elements as the one or more topological relationships develop relative to each of the one or more steps performed during the test execution on the application under test; and transmitting, by one or more computer processors, one or more test data overlays relevant to each of the one or more steps performed during the text execution on the application under test.

9. A computer program product for dynamic test topology visualization, the computer program product comprising:

one or more computer readable storage media and program instructions stored on the one or more computer readable storage media, the program instructions comprising:

program instructions to retrieve test data from an application under test;

program instructions to create a visual diagram, wherein the visual diagram includes one or more topological elements, one or more topological relationships between the one or more topological elements, the test data, and a screen snapshot of the application under test;

program instructions to overlay the visual diagram with user interaction information; and program instructions to associate the visual diagram to the test execution performed on the application under test.

10. The computer program product of claim 9, wherein program instructions to retrieve test data from an application under test, further comprises at least one of:

program instructions to retrieve test data from the application under test from one or more databases;

program instructions to receive test data from the application under test from a testing tool; and program instructions to extract test data and system information from one or more test execution logs within the one or more databases.

11. The computer program product of claim 9, wherein program instructions to create a visual diagram, further comprises:

program instructions to convert test data, system information, and a plurality of text statements within the test data and the system information into one or more visual diagram elements.

12. The computer program product of claim 11, wherein the one or more visual elements include one or more of:

a snapshot of an application screen;

a graphical representation of the test data, the system information, and the plurality of text statements;

a connector to a server;

a network type; and a native device feature.

13. The computer program product of claim 9, wherein program instructions to overlay the visual diagram with user interaction information, further comprises:

program instructions to overlay test data and a plurality of performance indicators on top of the visual diagram correlated to tester interaction with a testing tool.

14. The computer program product of claim 9, wherein program instructions to associate the visual diagram to the test execution performed on the application under test, further comprises:

program instructions to store the visual diagram and test execution association.

15. The computer program product of claim 9 further comprises:

program instructions to perform a walkthrough of a test execution performed on the application under test.

16. The computer program product of claim 15, wherein program instructions to perform a walkthrough of a test execution performed on the application under test, further comprises:

program instructions to transmit visual information in a step by step navigation;

program instructions to transmit one or more topological elements relative to one or more steps performed during the test execution on the application under test;

program instructions to transmit one or more topological relationships between the one or more topological elements as the one or more topological relationships develop relative to each of the one or more steps performed during the test execution on the application under test; and program instructions to transmit one or more test data overlays relevant to each of the one or more steps performed during the text execution on the application under test.

17. A computer system for dynamic test topology visualization, the computer system comprising:

one or more computer readable storage media;

program instructions stored on at least one of the one or more computer readable storage media for execution by at least one of the one or more computer processors, the program instructions comprising:

program instructions to retrieve test data from an application under test;

program instructions to create a visual diagram, wherein the visual diagram includes one or more topological elements, one or more topological relationships between the one or more topological elements, the test data, and a screen snapshot of the application under test;

program instructions to overlay the visual diagram with user interaction information; and program instructions to associate the visual diagram to the test execution performed on the application under test.

18. The computer system of claim 17, wherein program instructions to retrieve test data from an application under test, further comprises at least one of:

program instructions to retrieve test data from the application under test from one or more databases;

program instructions to receive test data from the application under test from a testing tool; and program instructions to extract test data and system information from one or more test execution logs within the one or more databases.

19. The computer system of claim 17, wherein program instructions to create a visual diagram, further comprises:

program instructions to convert test data, system information, and a plurality of text statements within the test data and the system information into one or more visual diagram elements.

20. The computer system of claim 19, wherein the one or more visual elements include one or more of:

a snapshot of an application screen;

a graphical representation of the test data, the system information, and the plurality of text statements;

a connector to a server;

a network type; and a native device feature.

* * * * *